United States Patent
Sato

(10) Patent No.: US 8,094,395 B2
(45) Date of Patent: Jan. 10, 2012

(54) MAGNETIC TRANSFER METHOD AND MAGNETIC RECORDING MEDIUM

(75) Inventor: Narumi Sato, Yamanashi (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 0 days.

(21) Appl. No.: 12/828,164

(22) Filed: Jun. 30, 2010

(65) Prior Publication Data
US 2011/0002059 A1  Jan. 6, 2011

(30) Foreign Application Priority Data

Jul. 2, 2009 (JP) ................ 2009-158108
Nov. 19, 2009 (JP) ................ 2009-263899

(51) Int. Cl.
*G11B 5/86* (2006.01)
(52) U.S. Cl. .............. 360/17; 360/15; 360/16
(58) Field of Classification Search .......... None
See application file for complete search history.

(56) References Cited

U.S. PATENT DOCUMENTS

| | | | |
|---|---|---|---|
| 6,469,848 B1 * | 10/2002 | Hamada et al. | 360/17 |
| 6,678,101 B2 * | 1/2004 | Nishikawa et al. | 360/15 |
| 6,906,875 B2 * | 6/2005 | Kamatani et al. | 360/17 |
| 7,105,238 B2 * | 9/2006 | Ozawa et al. | 428/826 |
| 7,187,510 B2 * | 3/2007 | Yasunaga et al. | 360/16 |
| 2002/0051306 A1 * | 5/2002 | Nishikawa et al. | 360/17 |
| 2002/0075583 A1 * | 6/2002 | Ishida et al. | 360/17 |

FOREIGN PATENT DOCUMENTS

| | | |
|---|---|---|
| JP | 61-063929 A | 4/1986 |
| JP | 11-025455 A | 1/1999 |
| JP | 11-161956 A | 6/1999 |
| JP | 2003-281715 A | 10/2003 |
| JP | 2004-234710 A | 8/2004 |

* cited by examiner

*Primary Examiner* — Dismery Mercedes
(74) *Attorney, Agent, or Firm* — Rabin & Berdo, P.C.

(57) ABSTRACT

A magnetic transfer method includes a conjoined body formation step of stacking a transfer master storing transfer information on a transfer receiving body. Air between contact surfaces of the transfer master and transfer receiving body is pushed out in the direction of a non-pressurized area by pressurizing the stacked transfer master and transfer receiving body, to form the conjoined body. The method further includes a transfer step of, by bringing a magnetic field generating module close to the conjoined body, and applying a magnetic field, carrying out a magnetic transfer of the transfer information from the transfer master to the transfer receiving body. A surface roughness of smooth portions of the transfer master in which no transfer information is formed, and the surface roughness of the transfer receiving body, is 1 nm or less.

21 Claims, 10 Drawing Sheets

MAGNETIC TRANSFER METHOD AND MAGNETIC RECORDING MEDIUM

CROSS-REFERENCE TO RELATED APPLICATIONS

This application claims priority under 35 U.S.C. §119 from JP PA 2009-158108, filed Jul. 2, 2009, and JP PA 2009-263899, filed Nov. 19, 2009. The entirety of each of the identified applications is incorporated herein by reference.

BACKGROUND OF THE INVENTION

1. Technical Field

The present invention relates to a magnetic transfer method and magnetic recording medium. More specifically, it relates to a magnetic transfer method whereby a servo signal or specific data for positioning a magnetic head which carries out a writing and reading of data written onto a magnetic recording medium in a hard disc drive (hereafter called an HDD) is written onto a magnetic recording medium using a magnetic transfer technique, and to a magnetic recording medium onto which transfer information is written using the magnetic transfer method.

2. Related Art

At present, the writing of magnetic information onto a magnetic recording medium is carried out in the following way. That is, after a magnetic recording medium in a condition in which no magnetic information is written thereon is set in an HDD device, necessary magnetic information is written into concentric areas with uniform widths on the magnetic recording medium, called tracks, inside the HDD.

The reading and writing of the data is carried out while a magnetic head moves along the tracks. At this time, the magnetic head detects a positional misalignment of the tracks by means of a magnetic signal, called a servo signal, written onto the magnetic recording medium, and is controlled so as not to deviate from the tracks.

In order to accurately write servo signals concentrically on a magnetic recording medium on which nothing is written, it is necessary to insert a device with a precise position control function from the exterior for every HDD, and several hours are needed to write several hundred thousand tracks onto one surface. Along with a recent improvement in recording density, a position control device of even higher precision, and a longer writing time, has become necessary, leading to a considerable disadvantage from the aspects of HDD productivity and cost.

Therefore, a technique and device have been developed with which, by bringing the transfer master with the servo signal pattern into close contact with a magnetic recording medium, and applying a magnetic field from the exterior, the servo signal pattern is instantaneously transferred to the magnetic recording medium. Because of this, it is possible to reduce the drive manufacturing cost and increase the track density (narrow the track width).

However, when attempting to bring the transfer master and magnetic recording medium, which are both smooth surfaces, into overall close contact at one time, the order in which the surfaces are brought into close contact, from the start to the finish of the bringing into close contact, is left to chance. Depending on the order, there arises a problem such as the air between the transfer surface and transfer receiving surface being trapped, and an "air accumulation" occurring, so that the transfer master and magnetic recording medium do not come into good close contact. The predetermined servo signal is not transferred to a place where the air is accumulated, and a missing signal error occurs.

Considering this situation, a method has been proposed whereby, for example, the transfer master and magnetic recording medium are brought into close contact inside a pressurizing chamber or inside a depressurizing chamber, in an attempt for a highly accurate, even close contact of the transfer master and magnetic recording medium (for example, refer to JP-A-2004-234710 and JP-A-2003-281715).

Also, there is also a proposal to provide an air escape groove or hole in the transfer master, and through this to bring the transfer master and magnetic recording medium into close contact by suctioning (for example, refer to JP-A-11-025455).

However, with the method described in JP-A-2004-234710, as a chamber of a thickness which can withstand the pressurization or depressurization necessary for an overall close contact, for example, a thickness of a few millimeters, is interposed between a magnetic field generating module and a conjoined body, there is a problem in that it is not possible to bring the magnetic field generating module close to the conjoined body, and the transfer signal strength decreases.

Also, in order to provide an air escape groove or hole in the transfer master, as in JP-A-11-025455, there is a need to make a precisely controlled microscopic form in the range of a few to a few hundred microns in the transfer master.

Therefore, a method has been proposed whereby the order of bringing into close contact is controlled by a linear pressurization with a roller, with no need for the above-described chamber structure, or making of a groove or hole in the transfer master (for example, refer to JP-A-61-063929).

Also, there is a proposal whereby, as a master such that both parties come into particularly close contact when a master including an information code and a magnetic disc are brought into close contact, the master is curved in such a way that, in a natural condition, the central portion of the surface of the master facing the magnetic disc approximates the magnetic disc (for example, refer to JP-A-11-161956). According to this proposal, it is possible to sequentially expand the contact area of the master and magnetic disc from the central portion to the external peripheral portion during the process of bringing the master and magnetic disc into close contact. With this approach it is possible to expel the air between the master and magnetic disc without it accumulating, and to therefore bring the master and magnetic disc into particularly close contact.

With the method described in JP-A-11-161956, in order to curve the master, a stress film with a high thermal expansion coefficient in comparison with that of a master substrate made of glass, silicon, or the like, is affixed to a master substrate at a temperature higher than room temperature, and furthermore, by making a slit in the master substrate, the bending rigidity of the master substrate is reduced, and the amount of deformation is increased.

With the method described in JP-A-61-063929, the area sandwiched and pressurized by the roller is brought evenly into close contact, but as soon as the roller passes, the close contact is released. As a magnetic field must be applied while the close contact condition is maintained, it follows that there is no freedom in the disposition of the roller and magnetic field generating module and, for example, in the event of installing a magnetic field generating module on both sides, or in the event of increasing the size of the magnetic field generating module in order to strengthen the magnetic field, the pressurization range of the roller becomes insufficient, with the result that a missing signal occurs.

The same problem applies also to the previously described JP-A-2004-234710 and JP-A-11-025455. That is, as it is necessary to bring the magnetic field generating module close with the pressurized or depressurized condition still maintained in order to carry out a magnetic transfer while maintaining an even, close contact condition, a way of maintaining close contact during the magnetic transfer is essential with either method.

With the method described in JP-A-11-161956, it being necessary to deposit a stress film so that it becomes a homogeneous film at a temperature higher than room temperature, the manufacture of the master is troublesome, and the cost increases. Also, as it curves at room temperature, and contains a slit, the master substrate is of low strength, is difficult to handle, and the like.

SUMMARY OF THE INVENTION

Bearing in mind the foregoing description, the invention has an object of providing a magnetic transfer method whereby there is no need to interpose a chamber between the magnetic field generating module and conjoined body, and no need to make a groove or hole in the transfer master. Moreover, the highly accurate close contact required for a magnetic transfer is realized, and no missing signal error is caused in the transfer receiving body.

In order to achieve the aforementioned object, a magnetic transfer method of the invention includes a conjoined body formation step of stacking a flat transfer master, on which is formed magnetic transfer information, and a transfer receiving body one on the other, and forming a conjoined body configured (e.g., consisting) only of the transfer master and transfer receiving body, by pushing air present between contact surfaces of the transfer master and transfer receiving body out in the direction of a non-pressurized area, by pressurizing at least one portion of a surface of the transfer master, with the pressurized area as the origin (e.g., acting as an area of origin of the pushing).

The method further comprises a magnetic transfer step including, by bringing a magnetic field generating module close to the conjoined body, and applying a magnetic field while moving the magnetic field generating module and conjoined body in relation to each other, carrying out a magnetic transfer of the transfer information from the transfer master to the transfer receiving body. A surface roughness Ra of smooth portions of the transfer master in which no transfer information is formed is 1 nm or less, and the surface roughness Ra of the transfer receiving body is 1 nm or less.

Additionally, a magnetic recording medium according to the invention can store magnetic transfer information transferred using the magnetic transfer method.

Put in other terms, embodiments of the invention relate to a method that can comprise stacking a transfer master storing magnetic transfer information on a transfer receiving body, and applying pressure to at least a portion of the stacked transfer master and transfer receiving body to form a conjoined body. The method can further comprise moving the conjoined body relative to a magnetic field to transfer the transfer information to the transfer receiving body. The applying of pressure can remove air from between the transfer master and the transfer receiving body.

The transfer master can comprise an information transfer surface, the information transfer surface including a first surface portion storing magnetic transfer information, and a second surface portion different from the first surface portion, the second surface portion having a surface roughness of 1 nm or less. The transfer receiving body can have a surface roughness of 1 nm or less.

The method can further comprise applying the pressure in a direction from an inner part of the transfer master to an outer part of the transfer master, or from one end of the transfer master to another end of the transfer master. The pressure can be applied with a pressure of 2.0 to 20 kg/cm². Further, the pressure can be applied with a pressure of 0.5 to 20 kg/cm². The pressure can be applied with suction or a roller, for example.

Embodiments of the invention further relate to a method that can comprise forming a transfer master, a surface of the transfer master including patterned areas corresponding to transfer information, and areas other than the patterned area, the areas other than the patterned areas having a surface roughness of 1 nm or less. The method can further comprise forming a transfer receiving medium having a surface roughness of 1 nm or less, and bringing the surface of the transfer master and the surface of the transfer receiving medium into contact.

The method can still further comprise applying pressure to the transfer master and transfer receiving medium to form a conjoined body, and applying a magnetic field to the conjoined body to transfer the transfer information from the transfer master to the transfer receiving medium. The applying of pressure can include using one of suction or a roller.

According to the invention, it is possible to bring the transfer master and transfer receiving body into even, overall close contact, with no need for a chamber structure, or to make a groove or hole in the transfer master. Therefore, it is possible to carry out a magnetic transfer without causing a missing signal error in the transfer receiving body. Also, according to the invention, because a conjoined body configured (e.g., consisting) only of the transfer master and transfer receiving body can be formed, it is possible to bring the magnetic field generating module extremely close to the conjoined body, and it is possible to increase the transfer signal strength.

DETAILED DESCRIPTION OF THE INVENTION

In the following, with reference to the drawings, a detailed description will be given of illustrative embodiments of the invention.

Figure 1:
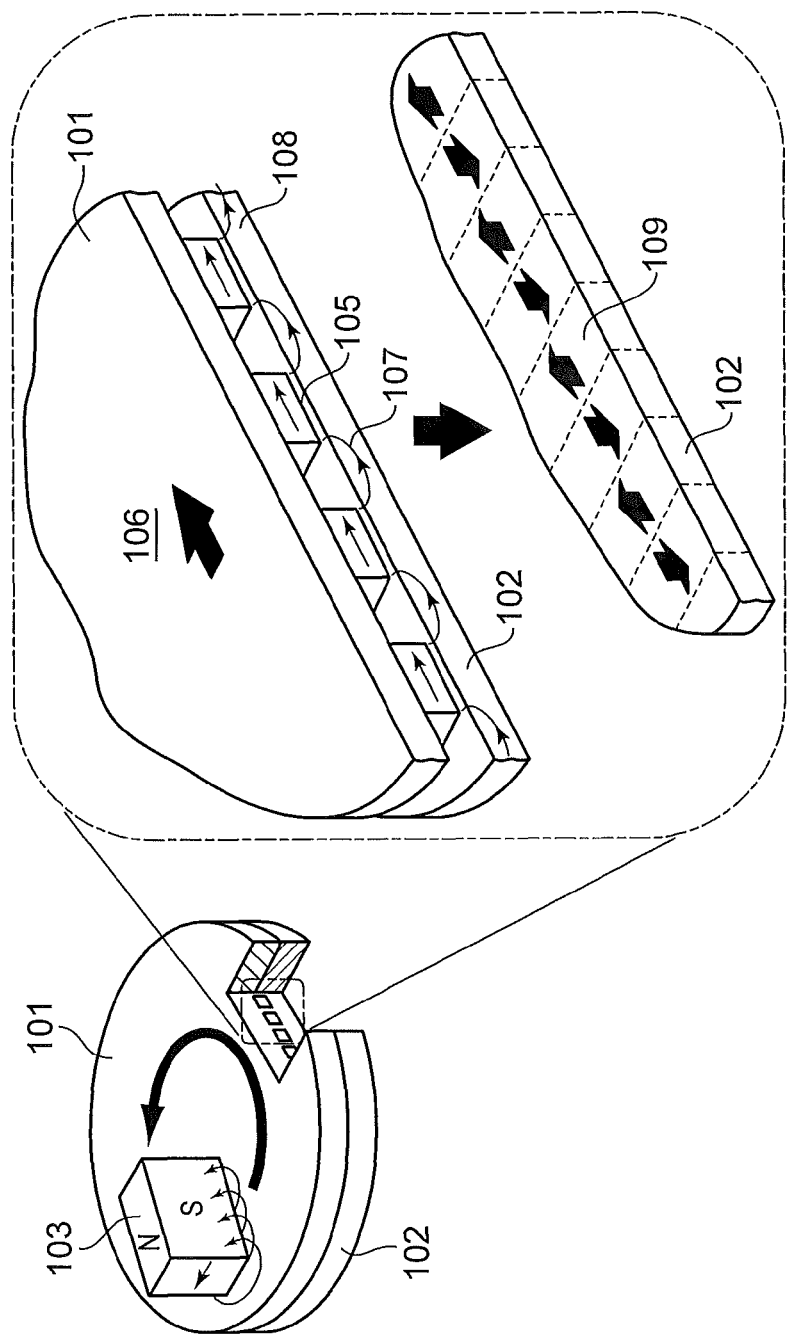
FIG. 1 is a diagram schematically showing a magnetic transfer principle of an edge transfer method.

FIG. 1 is a diagram schematically showing a magnetic transfer principle of an edge transfer method.

Figure 7:
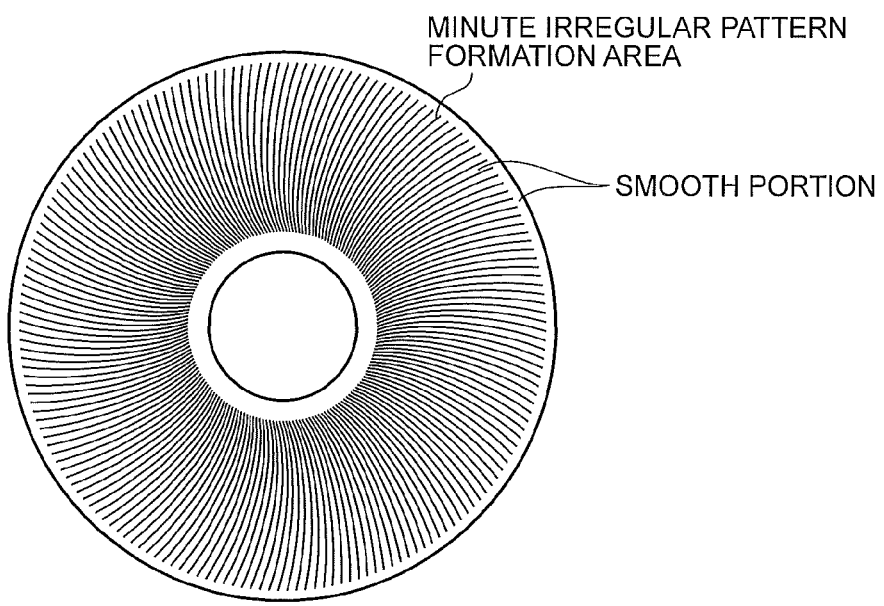
FIG. 7 is a diagram schematically showing minute pattern formation areas of a transfer master.

A minute pattern corresponding to transfer information is provided in a soft magnetic body on a flat substrate of a transfer master 101. A surface roughness Ra of portions of the transfer master 101 in which the minute pattern corresponding to the transfer information is not formed (the white portions in FIG. 7) is 1 nm or less. It is preferable that the smooth portions in which the minute pattern corresponding to the transfer information is not formed constitute 20% or more of the area of the surface of the transfer master on which the transfer information is formed. In the event that the surface roughness Ra of the portions in which the minute pattern is not formed is of a value exceeding 1 nm, and in the event that the area of the smooth portions is less than 20% of the area of the surface of the transfer master on which the transfer information is formed, it becomes impossible for a conjoined body, formed by bringing the transfer master 101 and a transfer receiving medium 102 into close contact, to maintain the conjoined condition by itself.

Also, it is necessary that the transfer master 101 is substantially flat. Herein, that the transfer master 101 is flat means that the transfer master is not curved. It is preferable that the flatness of the transfer master 101 is 10 μm or less. This is because, in the event that the flatness of the transfer master 101 is of a size exceeding 10 μm, it becomes difficult to maintain the close contact between the transfer master and transfer receiving medium. That the flatness is 10 μm or less here means that, when the transfer master is placed on a horizontal surface, no portion of the transfer master is raised more than 10 μm from the horizontal position.

When the transfer receiving medium 102 is brought into close contact with the transfer master 101, a magnetic layer 108 of the transfer receiving medium 102 is magnetized by a leakage flux 107 moving into the transfer receiving medium 102 side, and an external magnetic field is applied by moving a magnet 103 in a moving direction 106 of the external magnetic field. Additionally, a magnetic signal according to the soft magnetic body pattern of the transfer master 101 is transferred. A direction of magnetization is indicated by 109 in FIG. 1. The surface roughness Ra of the transfer receiving medium 102 used here is 1 nm or less. This is because, in the event that the surface roughness Ra of the transfer receiving medium is of a value exceeding 1 nm, it becomes impossible for the conjoined body to maintain the conjoined condition by itself.

Also, it is preferable that the flatness of the transfer receiving medium 102 is 10 μm or less. This is because, in the event that the flatness of the transfer receiving medium 102 is of a size exceeding 10 μm, it becomes impossible for the conjoined body to maintain the conjoined condition by itself.

Figure 2:
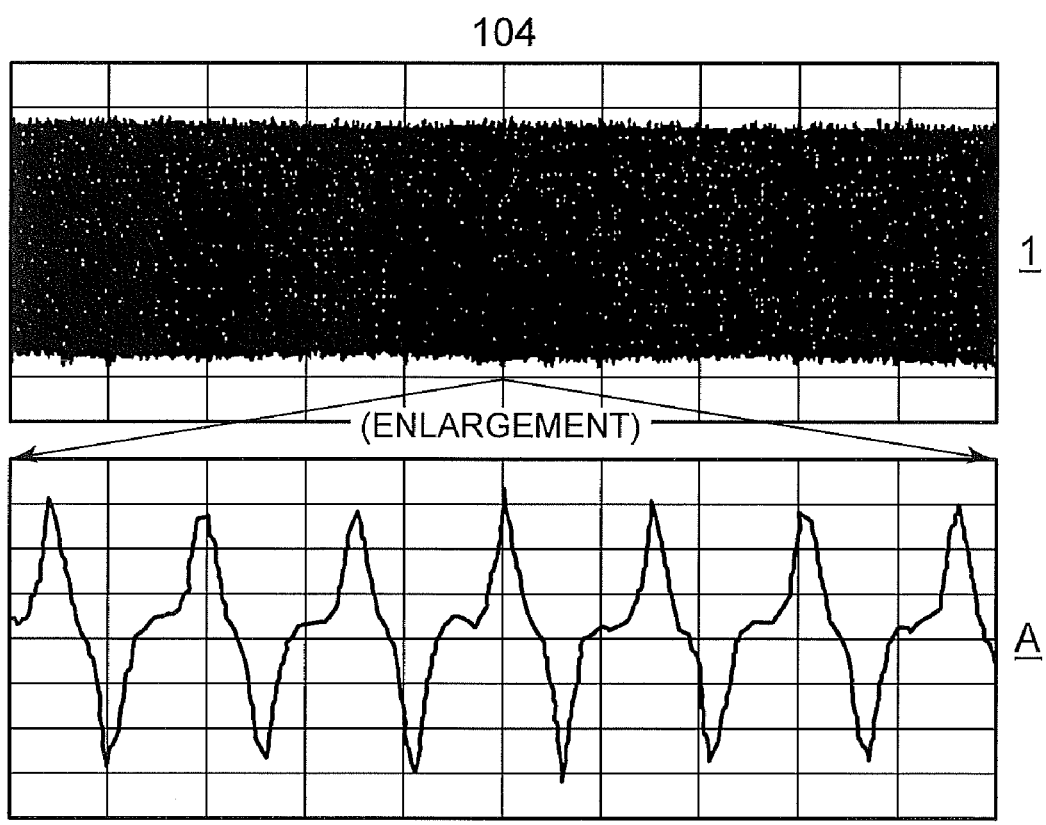
FIG. 2 is a diagram showing one example of a transfer signal.

One example of the magnetic signal 104 is shown in FIG. 2 (comprising an upper part "1" and an enlarged view thereof). Because a transfer is performed using a magnetic flux leaking from the edge of a land portion 105 of the soft magnetic body pattern of the transfer master 101, the method shown in FIG. 1 is called an edge transfer method.

Although FIG. 1 shows a situation in which a magnet 103 rotates on the master 101, transferring the whole of one side at one time, it is also possible to transfer both sides simultaneously. In this case, two transfer masters are brought into close contact with both sides of the transfer receiving medium, and magnets are also placed to face both sides thereof.

Figure 3:
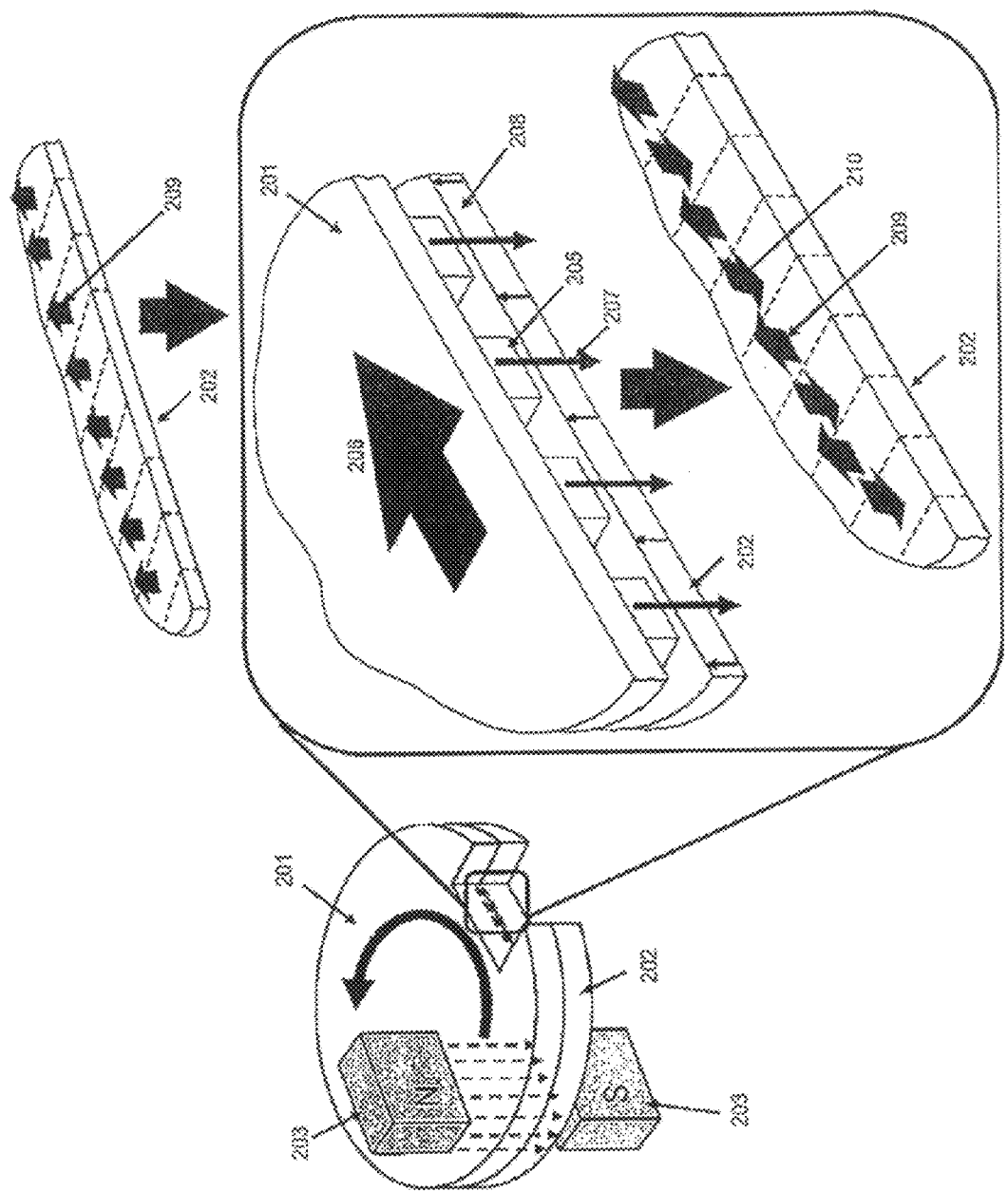
FIG. 3 is a diagram schematically showing a magnetic transfer principle of a bit transfer method.

FIG. 3 is a diagram illustrating another example of the magnetic transfer principle. A transfer receiving medium 202 having a magnetic layer 208 being magnetized in advance in one direction before the transfer, a magnetic field is applied during the transfer by a magnet moving to a moving direction 206 of the external magnetic field in a direction perpendicular to the contact surfaces of a transfer master 201 and the transfer receiving medium 202. The transfer receiving medium 202 is magnetized in a direction 210 opposite to the direction 209 of the initial magnetization, only in a portion of a land portion 205 of the soft magnetic body pattern of the transfer master 201 through which a magnetic flux 207 passes. This is called a bit transfer method.

Figure 4:
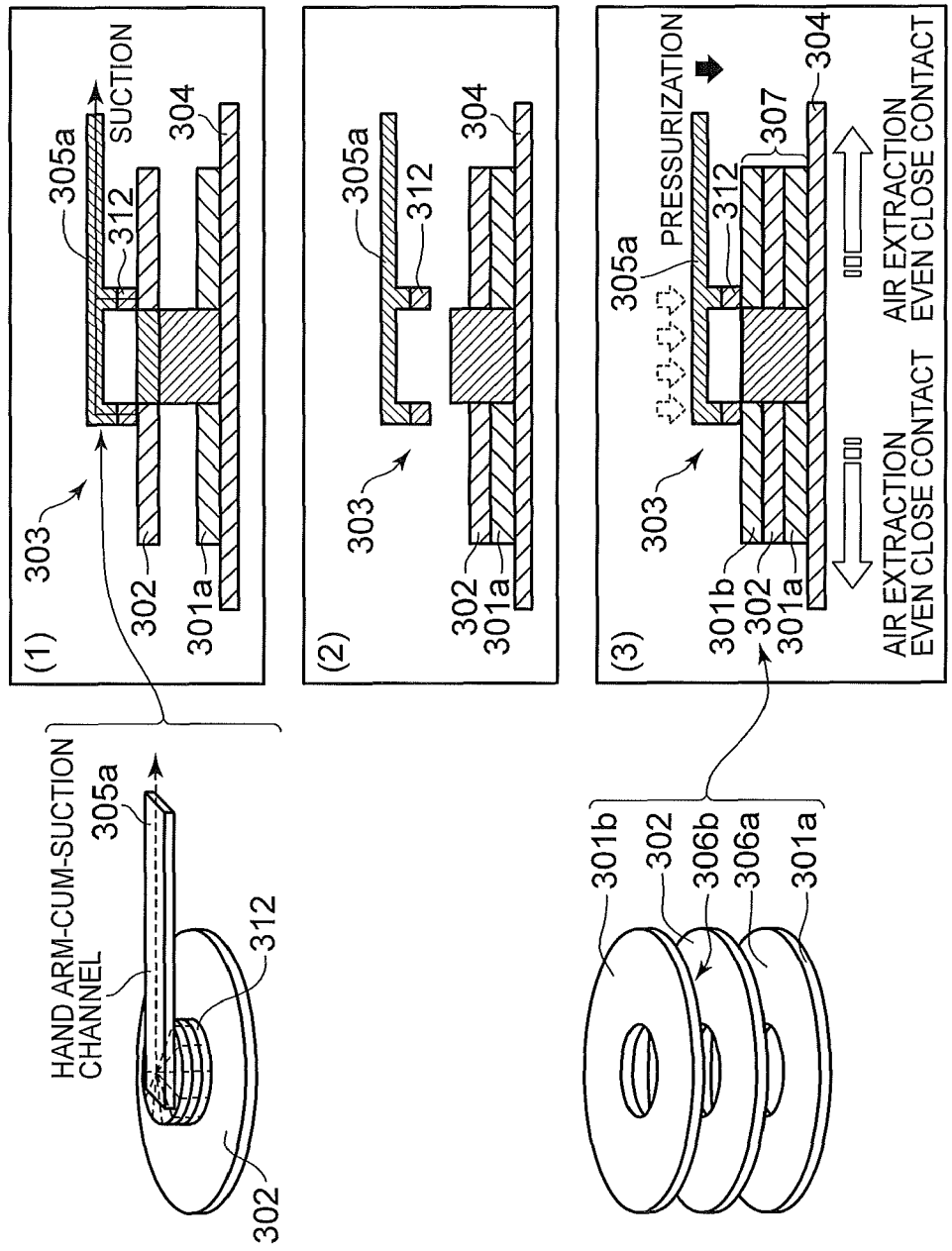
FIG. 4 shows diagrams (1), (2) (3) illustrating one example of a conjoined body formation process according to embodiments of the invention.

FIG. 4 shows diagrams (1), (2) and (3), illustrating one example of a conjoined body formation process according to the invention. Diagrams (1), (2) and (3) show a process of bringing transfer masters 301a and 301b, and a transfer receiving medium 302, into close contact. That is, in a conjoining unit 303, a conveyor hand 305a sequentially conveys the master 301a, medium 302, and master 301b by suctioning and grasping them, and stacks them on a stage 304. Soft magnetic body minute pattern formation surfaces 306a and 306b of the transfer masters 301a and 301b face the transfer receiving medium 302. At the point at which the three are stacked, the conveyor hand 305a pressurizes the inner peripheral area of the master 301b with a predetermined force. Because of this, air present between the masters 301a and 301b and medium 302 is pushed out toward the outer periphery, and contact surfaces are brought into close contact evenly over the whole surface, with no air being accumulated, forming a conjoined body 307.

It is preferable that the aforementioned hand pressurization is carried out with a pressure of 2.0 to 20 kg/cm². In the event that the hand pressurization is less than 2.0 kg/cm², the closeness of the contact between the transfer masters 301a and 301b and transfer receiving medium 302 is insufficient, so that the air does not escape, while in the event that the hand pressurization exceeds 20 kg/cm², there is a danger that the master 301b will crack.

Figure 5:
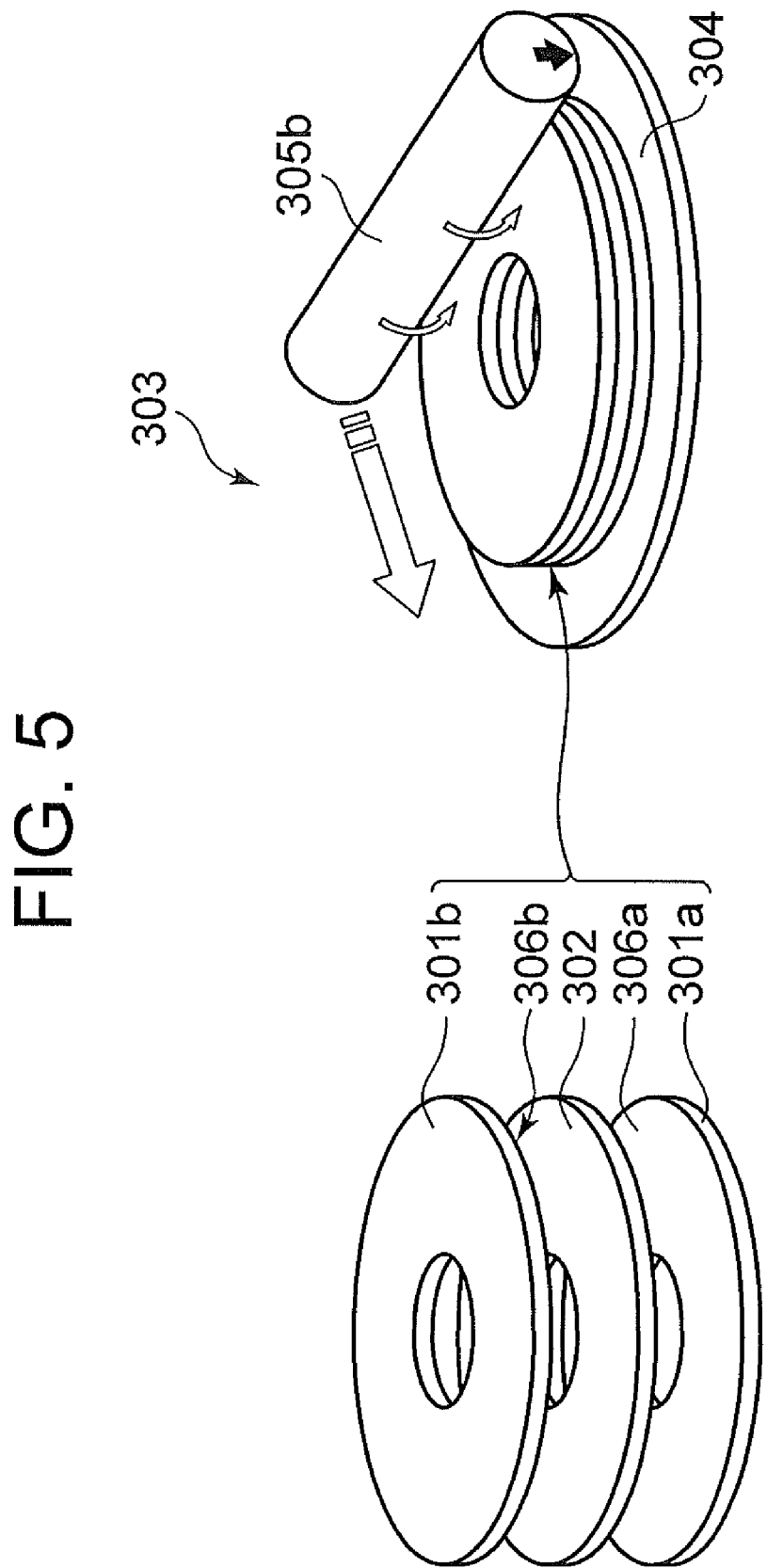
FIG. 5 is a diagram showing another example of the conjoined body formation process according to embodiments of the invention.

FIG. 5 is a diagram showing another example of the conjoined body formation process according to the invention. FIG. 5 shows a process of bringing the transfer masters 301a and 301b, and the transfer receiving medium 302, into close contact using a roller. That is, in the conjoining unit 303, the masters 301a and 301b, and the transfer receiving medium 302, are stacked on the stage 304, and are pressurized all over, partially and continuously, from one end portion to the other end portion, with a roller 305b. Because of this, the contact surfaces of both masters 301a and 301b and the transfer receiving medium 302 are brought into close contact evenly all over, with no air being accumulated, forming the conjoined body 307.

It is preferable that the aforementioned roller 305b pressurization is carried out with a pressure of 0.5 to 20 kg/cm². In the event that the roller pressurization is less than 0.5 kg/cm², it is difficult for the air intervenient between the transfer masters 301a and 301b and transfer receiving medium 302 to escape, and the closeness of the contact becomes insufficient.

Meanwhile, it is undesirable that the roller pressurization exceeds 20 kg/cm², because there arises a risk that the transfer master 301b cracks.

Figure 6:
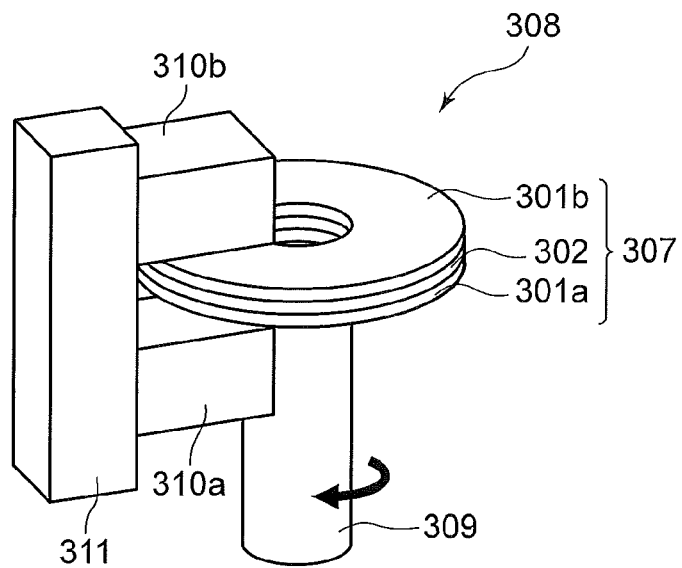
FIG. 6 is a diagram showing one example of a magnetic transfer process according to embodiments of the invention.

Next, the conjoined body 307 formed as shown in FIG. 4 or FIG. 5 is conveyed to a magnetic transfer unit 308 as shown in FIG. 6, still maintained in the close contact condition, and fixed on a spindle 309.

In the magnetic transfer unit 308, by means of an operation of a drive module 311 to which magnets 310a and 310b are attached, the magnets 310a and 310b come extremely close to the conjoined body 307. By the spindle 309 rotating, a predetermined magnetic signal is transferred all over the surface of the medium 302.

Figure 11:
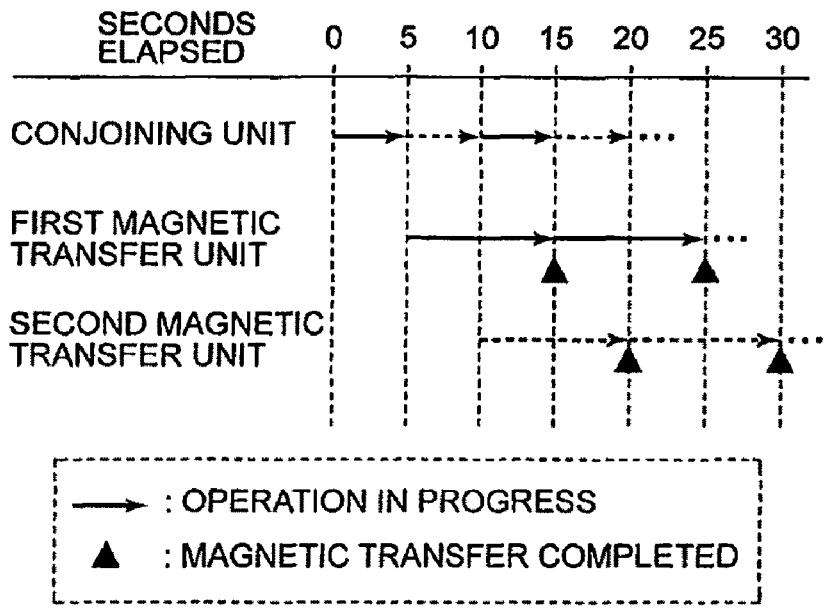
FIG. 11 is a diagram showing a device operation flow when carrying out continuous magnetic transfers using one conjoining unit and two magnetic transfer units.

Because the conjoined body 307 formed by the above-described conjoined body formation processes, once brought into close contact, can maintain the close contact condition, two magnetic transfer units 308 are prepared for one conjoining unit 303. Additionally, as shown in FIG. 11, while a magnetic transfer is being carried out in a first magnetic transfer unit 308 in a conjoined body 307 formed in the conjoining unit 303, a new conjoined body 307 is made in the conjoining unit 303, and conveyed to a second magnetic transfer unit 308, where a transfer is carried out. By arranging the manufacturing process so that, upon the transfer finishing in the first magnetic transfer unit 308, the next conjoined body 307 again is provided to the first magnetic transfer unit 308, and it is possible to continuously manufacture transfer receiving mediums to which a magnetic transfer has been carried out.

Working Example 1

In a Working Example 1 described in more detail in the following, a transfer master is manufactured, and a magnetic transfer is carried out using the conjoining unit 303 shown in FIG. 4, and the magnetic transfer unit 308 shown in FIG. 6. A signal transferred to the medium is read by a magnetic head, and a track average amplitude (TAA=an average value of one cycle's worth of signal output) representing the signal strength is obtained.

To form the transfer master, after depositing an Fe50Co soft magnetic layer and a carbon protective layer by sputtering on an amorphous glass substrate with an outer diameter of 65 mm and an inner diameter of 20 mm, and applying a resist, a nickel stamper on which is formed a minute pattern corresponding to a predetermined servo signal pattern is pressed against the resist surface, reproducing the minute pattern on the resist surface.

After etching the resist using dry etching, the minute pattern is formed on the soft magnetic layer by ion milling. The resist and carbon protective layer are detached by dry etching again, completing the transfer master 301. At this time, the height difference between the formed lands and grooves is approximately 30 nm.

The surface roughness Ra of the portions other than the minute pattern is 0.45 to 0.5 nm, while the flatness of the transfer master 301 is 3.4 μm. The pattern formation areas of the transfer master 301 are shown schematically in FIG. 7. The black portions are the pattern formation areas, and occupy 19% of the master surface area (therefore, the smooth portions occupy 81%).

Also, a magnetic recording medium wherein a magnetic layer and protective layer are formed by sputtering on an amorphous glass substrate with an outer diameter of 65 mm and an inner diameter of 20 mm, as with the transfer master 301, and furthermore a lubricating agent is applied thereon, is used as the transfer receiving medium 302. The surface roughness Ra is 0.2 nm, while the flatness is 3.2 μm.

After the transfer masters 301a and 301b, and the transfer receiving medium 302, are sequentially stacked by the conveyor hand 305a in such a way that the minute pattern surfaces of the masters 301a and 301b face the medium 302, the master 301b is pressurized for five seconds with a load of 6.5 kg/cm² by the conveyor hand 305a. Even when removing the obtained conjoined body 307 from the stage 304, the masters 301a and 301b and medium 302 do not come apart from each other.

As the conveyor hand grips the masters and medium by suctioning, a natural rubber cylindrical elastic body 312 with an outer diameter of 24.0 mm and an inner diameter of 20.0 mm is appended to the portion which comes into contact with the masters and medium.

The conjoined body 307 is placed over the spindle 309 of the magnetic transfer unit 308, gripping the inner periphery, and the magnets 310a and 310b are set 0.5 mm away from either side of the conjoined body 307. After rotating the spindle twice at a speed of five seconds per revolution, the magnets are moved well away from the conjoined body 307, and the conjoined body 307 is removed.

Figure 8:
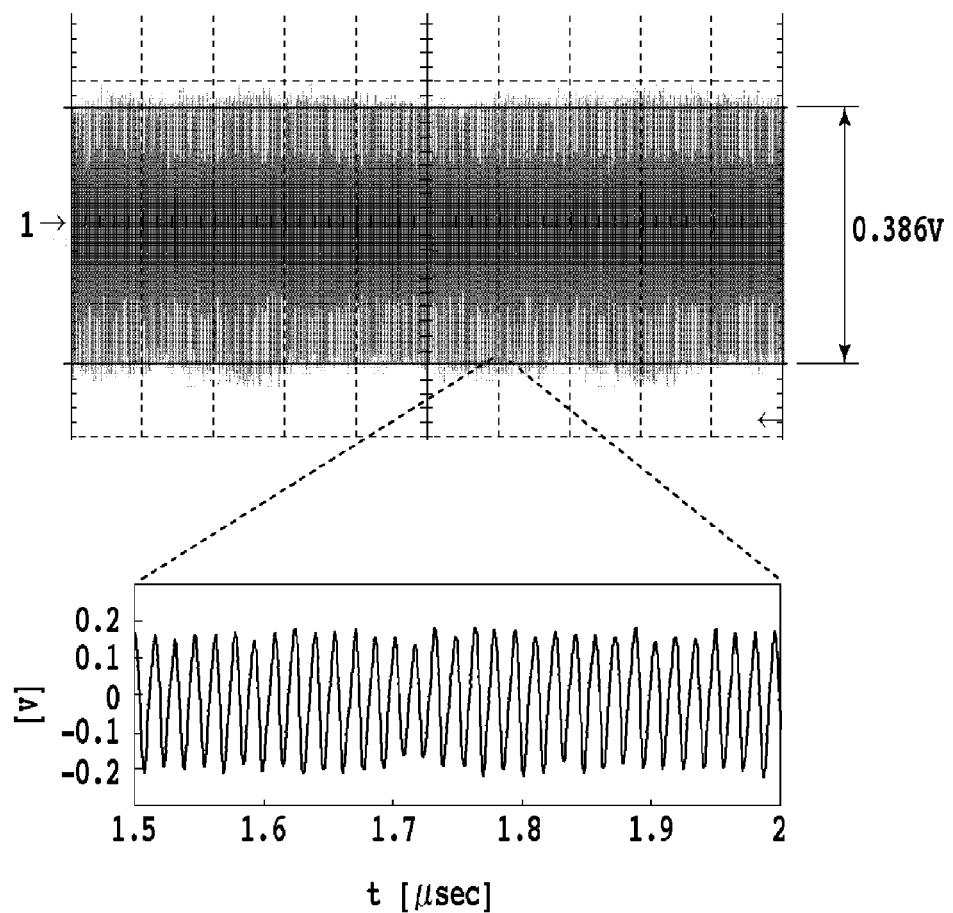
FIG. 8 is a diagram showing one example of a signal waveform of a transfer receiving body obtained in a Working Example 1.

The transfer masters 301a and 301b and transfer receiving medium 302 are separated, the signal of the transfer receiving medium 302 is read by the magnetic head, and the TAA is obtained. One example of the signal waveform is shown in FIG. 8 (comprising an upper part "1" and an enlarged view thereof).

In order to confirm the reproducibility of the experiment, the above procedure from the conjoining to the magnetic transfer is carried out again with the same transfer masters 301a and 301b, and the magnetic transfer is carried out to another, separate medium too. The TAAs of the transfer receiving mediums 302 obtained are shown in Table 1 (below).

Working Examples 2 to 6

With the configuration of Working Examples 2 to 6, other than variations in the load with which the conveyor hand 305a pressurizes the master 301b as shown below, the transfer receiving medium 302 is obtained in the same way as in Working Example 1. The TAAs of the transfer receiving mediums 302 obtained are shown in Table 1.
Variations in load per Working Example:
Working Example 2: 2.0 kg/cm²
Working Example 3: 2.5 kg/cm²
Working Example 4: 3.0 kg/cm²
Working Example 5: 10.0 kg/cm²
Working Example 6: 20.0 kg/cm²

Comparison Example 1

Figure 9:
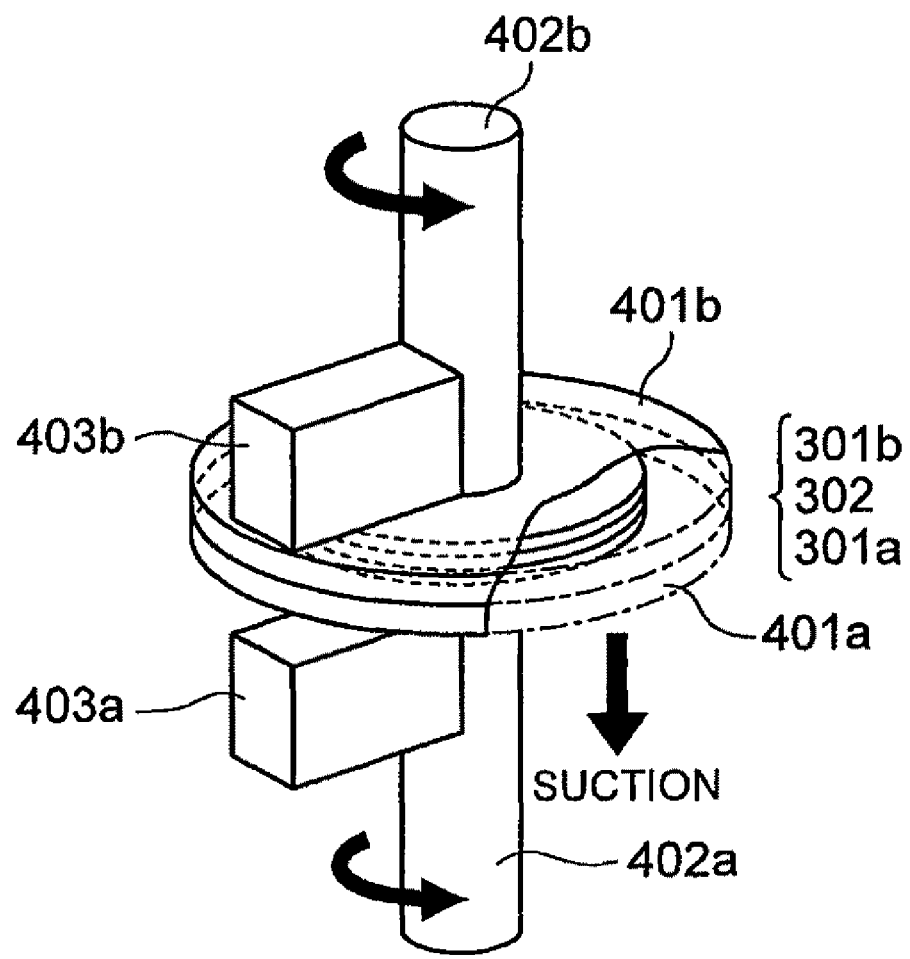
FIG. 9 is a diagram showing one example of a known magnetic transfer device.

Using the transfer masters 301a and 301b used in Working Example 1, and another transfer receiving medium 302 with the same configuration as that of Working Example 1, a magnetic transfer is carried out by a known magnetic transfer method shown in FIG. 9. First, the two transfer masters 310a and 301b, and the transfer receiving medium 302, are set inside an SUS chamber 401 (formed by stacking 401a and 401b one on the other) with a thickness of 2.5 mm, and are brought at one time into overall close contact by the pressure being reduced by 85 kPa by suctioning through a suction opening (not shown) provided between 401a and 401b. Still maintaining this condition, magnets 403a and 403b are moved nearer to a position 0.3 mm away from the chamber

401. After rotating the magnets 403a and 403b twice at a speed of five seconds per revolution with drive modules 402a and 402b, the magnets are withdrawn, the pressure reduction of the chamber 401 is stopped, and the chamber 401 is opened to the atmosphere.

Figure 10:
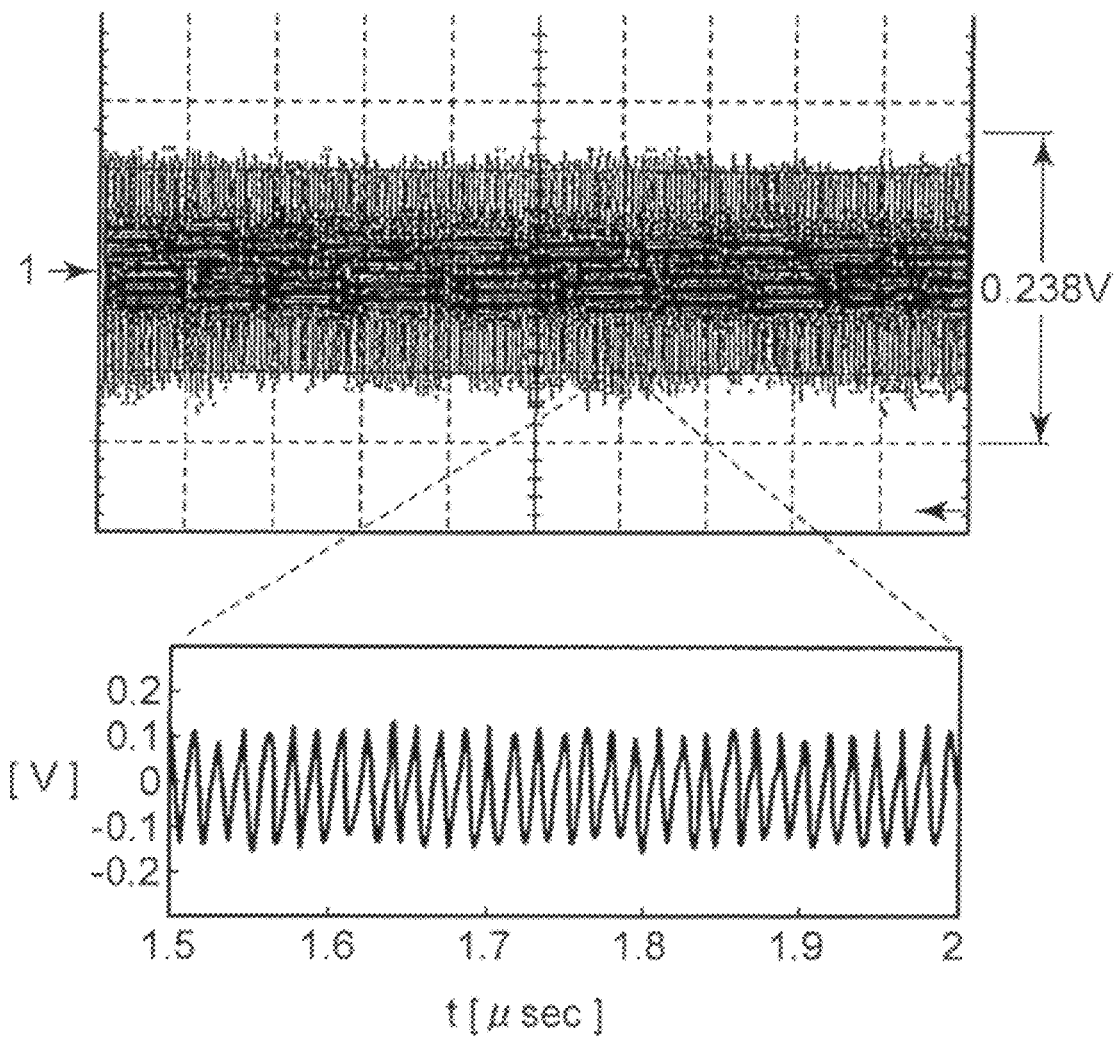
FIG. 10 is a diagram showing one example of a transfer signal waveform transferred using a known transfer method.

In order to confirm the reproducibility of the experiment, the above procedure from the conjoining to the magnetic transfer is carried out again with the same transfer masters 301a and 301b, and the magnetic transfer is carried out to another, separate medium too. As a "missing signal" area exists on the surface of both of the transfer receiving mediums 302 obtained, the TAAs are obtained for one cycle at R=16.0 mm (medium 1) and R=24.5 mm (medium 2), at which there is no "missing signal", and compared. The results are shown in Table 1. One example of the signal waveform is shown in FIG. 10.

TABLE 1

| | | | | TAA (V) | | |
|---|---|---|---|---|---|---|
| | Pressurization Load (kg/cm²) | Measured Surface | Missing Signal | Medium 1 (measured at R = 16.0 mm) | Medium 2 (measured at R = 24.5 mm) | Average |
| Working Example 1 | 6.5 | Upper surface | No | 0.363 | 0.386 | 0.378 |
| | | Lower surface | No | 0.370 | 0.392 | |
| Working Example 2 | 2.0 | Upper surface | No | — | 0.368 | 0.370 |
| | | Lower surface | No | — | 0.372 | |
| Working Example 3 | 2.5 | Upper surface | No | — | 0.378 | 0.370 |
| | | Lower surface | No | — | 0.362 | |
| Working Example 4 | 3.0 | Upper surface | No | — | 0.393 | 0.397 |
| | | Lower surface | No | — | 0.400 | |
| Working Example 5 | 10.0 | Upper surface | No | — | 0.384 | 0.388 |
| | | Lower surface | No | — | 0.391 | |
| Working Example 6 | 20.0 | Upper surface | No | — | 0.377 | 0.373 |
| | | Lower surface | No | — | 0.369 | |
| Comparison Example 1 | (Chamber pressure reduced by 85 kPa) | Upper surface | Yes | 0.238 | 0.263 | 0.250 |
| | | Lower surface | Yes | 0.244 | 0.257 | |

(—: not measured)

Working Example 7

Magnetic transfer mediums are continuously manufactured using the one conjoining unit 303 shown in FIG. 4 and the two magnetic transfer units 308 shown in FIG. 6. That is, under the conditions that five seconds are needed for the conjoined body formation in the conjoining unit 303, and ten seconds for the magnetic transfer in the magnetic transfer unit 308, magnetic transfer mediums are continuously manufactured by a procedure wherein, as shown in FIG. 11, a conjoined body 307 is formed in the conjoining unit 303 and, as well as a magnetic transfer being carried out in this conjoined body 307 in the first magnetic transfer unit 308, a new conjoined body 307 is made in the conjoining unit 303, and conveyed to the second magnetic transfer unit 308, where a transfer is carried out. By means of this process, it is possible to manufacture at a speed of one medium every five seconds.

Comparison Example 2

Figure 12:
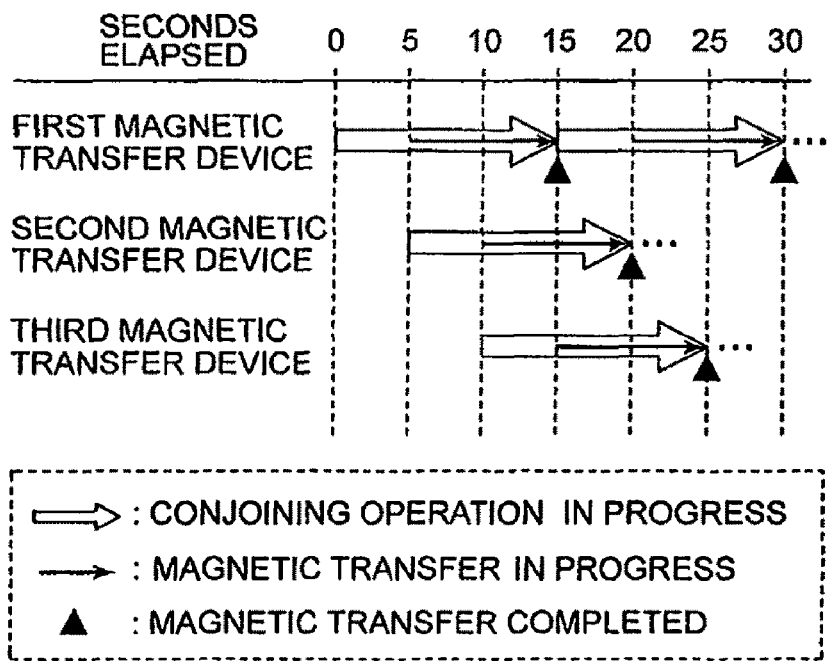
FIG. 12 is a diagram showing a device operation flow when carrying out continuous magnetic transfers using three magnetic transfer devices.

Magnetic transfer mediums are continuously manufactured with the known magnetic transfer device shown in FIG. 9. In order to continuously manufacture magnetic transfer mediums at a speed of one medium every five seconds under the conditions of five seconds for the conjoined body formation and ten seconds for the magnetic transfer, as in Working Example 7, it is found that three devices with a conjoining mechanism and transfer mechanism are necessary, as in the device operation flow shown in FIG. 12.

From Working Example 7 and Comparison Example 2, it is understood that, according to the invention, it is possible to maintain the same manufacturing speed as previously known, with a simpler device configuration.

Working Example 8

Using the same transfer masters 301a and 301b and transfer receiving medium 302 as those used in Working Example 1, the conjoined body 307 is formed by stacking the transfer masters 301a and 301b on either side of the transfer receiving medium 302 in such a way that the minute irregular pattern surfaces of the transfer masters 301a and 301b and the transfer receiving medium 302 face each other. Additionally, as shown in FIG. 5, pressurizing is performed with a load of 5 kg/cm² with the roller 305b, wherein natural rubber with a thickness of 0.8 mm is wrapped around a stainless steel cylinder with a diameter of 30 mm. In order to form the conjoined body 307 with no air accumulation, the rotational speed of the roller 305b is adjusted so that the conjoining proceeds at a speed of 13 mm per second, and the transfer masters 301a and 301b are brought into close contact with the transfer receiving medium 302 in five seconds. Even when removing the obtained conjoined body 307 from the roller, the transfer masters 301a and 301b and transfer receiving medium 302 do not become detached.

The conjoined body 307 is placed over the spindle 309 of the magnetic transfer unit 308, gripping the inner periphery, and the magnets 310a and 310b are set 0.5 mm away from either side of the conjoined body 307. After rotating the spindle twice at a speed of five seconds per revolution, the magnets are moved well away from the conjoined body 307, and the conjoined body 307 is removed.

The transfer masters 301a and 301b and transfer receiving medium are separated, the signal of the transfer receiving medium is read by the magnetic head, and the TAA is obtained. In order to confirm the reproducibility of the experiment, the above procedure from the conjoining to the magnetic transfer is carried out again with the same transfer masters 301a and 301b, and the magnetic transfer is carried out to another, separate medium too. The TAAs of the transfer receiving mediums obtained are shown in Table 2 together with the results of comparison example 1.

TABLE 2

| | | TAA (V) | | |
| --- | --- | --- | --- | --- |
| | | Medium 1 (measured at R = 16.0 mm) | Medium 2 (measured at R = 24.5 mm) | Average |
| Working Example 8 | Upper surface | 0.343 | 0.352 | 0.346 |
| | Lower surface | 0.339 | 0.348 | |
| Comparison Example 1 | Upper surface | 0.238 | 0.263 | 0.250 |
| | Lower surface | 0.244 | 0.257 | |

Working Examples 9 to 11 and Comparison Example 3

In the following description, aside from the surface roughness Ra of the portions other than the minute pattern being of the values shown in Table 3, the conjoined body is formed with the roller using the same transfer masters as those in Working Example 1, and the transfer receiving medium is the same as that used in Working Example 1. The surface roughness Ra of the portions other than the minute pattern of the transfer master used, and the possibility of maintaining the close contact after pressurization with the roller, are shown in Table 3. In Table 3, ○ indicates that the close contact can be maintained for 24 hours, while X indicates that the conjoined body comes apart after a few seconds.

TABLE 3

| | Ra | Close Contact Maintenance Possibility |
| --- | --- | --- |
| Working Example 9 | 0.20 nm | ○ |
| Working Example 10 | 0.34 nm | ○ |
| Working Example 11 | 0.86 nm | ○ |
| Comparison Example 3 | 1.13 nm | X |

From the results of Working Examples 1 to 6 and 8 to 11, and Comparison Example 3, it is understood that in the event that the surface roughness Ra of the portions other than the minute pattern of the transfer master is 1 nm or less, the closeness of contact between the transfer masters and transfer receiving medium is good.

Working Example 12

Magnetic transfer mediums are continuously manufactured using the one conjoining unit 303 shown in FIG. 5 and the two magnetic transfer units 308 shown in FIG. 6. That is, under the conditions that five seconds are needed for the conjoined body formation in the conjoining unit 303, and ten seconds for the magnetic transfer in the magnetic transfer unit 308, magnetic transfer mediums are continuously manufactured by a procedure wherein, as shown in FIG. 11, a conjoined body 307 is formed in the conjoining unit 303. Additionally, as well as a magnetic transfer being carried out in this conjoined body 307 in the first magnetic transfer unit 308, a new conjoined body 307 is made in the conjoining unit 303, and conveyed to the second magnetic transfer unit 308, where a transfer is carried out. By means of this process, it is possible to manufacture at a speed of one medium every five seconds.

From Working Example 12 and Comparison Example 2, it is understood that, according to the invention, it is possible to maintain the same manufacturing speed as previously known, with a simpler device configuration.

It will be apparent to one skilled in the art that the manner of making and using the claimed invention has been adequately disclosed in the above-written description of the exemplary embodiments taken together with the drawings. Furthermore, the foregoing description of the embodiments according to the invention is provided for illustration only, and not for limiting the invention as defined by the appended claims and their equivalents.

It will be understood that the above description of the exemplary embodiments of the invention are susceptible to various modifications, changes and adaptations, and the same are intended to be comprehended within the meaning and range of equivalents of the appended claims.

What is claimed is:

1. A magnetic transfer method comprising:
   a conjoined body formation step including
   stacking a flat transfer master, on which is formed magnetic transfer information on a transfer receiving body, and
   forming a conjoined body consisting only of the transfer master and transfer receiving body, by pushing air present between contact surfaces of the transfer master and transfer receiving body out in a direction of a non-pressurized area, by pressurizing at least one portion of a surface of the transfer master, the pressurized at least one portion acting as an area of origin of the pushing; and
   a magnetic transfer step including
   by bringing a magnetic field generating module close to the conjoined body, and applying a magnetic field while moving the magnetic field generating module and conjoined body in relation to each other, carrying out a magnetic transfer of the transfer information from the transfer master to the transfer receiving body;
   wherein a surface roughness of portions of the transfer master, in which no transfer information is formed, is 1 nm or less, and wherein the portions of the transfer master are brought into contact with portions of the transfer receiving body having a surface roughness of 1 nm or less.

2. The magnetic transfer method according to claim 1, wherein
   the at least one portion of the surface of the transfer master corresponds to an inner peripheral area of the surface of the transfer master, and the direction of the non-pressurized area is toward an outer peripheral area of the surface of the transfer master.

3. The magnetic transfer method according to claim 2, wherein
   the pressurizing of the inner peripheral area of the surface of the transfer master is carried out with a pressure of 2.0 to 20 kg/cm$^2$.

4. The magnetic transfer method according to claim 1, wherein
   the pressurizing of the at least one portion of the surface of the transfer master is performed with a roller while moving the roller continuously from one end portion of the surface of the transfer master to another end portion of the surface of the transfer master, to push air present between the contact surfaces of the transfer master and transfer receiving body from the one end portion to the other end portion.

5. The magnetic transfer method according to claim 4, wherein
the pressurizing with the roller is carried out with a pressure of 0.5 to 20 kg/cm².

6. The magnetic transfer method according to claim 1, wherein
the portions of the transfer master in which no transfer information is formed occupy 20% or more of an area of a surface of the transfer master in which the transfer information is formed.

7. The magnetic transfer method according to claim 1, wherein
the conjoined body formation step and magnetic transfer step are carried out in separate units.

8. A magnetic recording medium storing magnetic transfer information transferred using the magnetic transfer method according to claim 1.

9. A magnetic transfer method comprising:
a conjoined body formation step including
stacking a flat transfer master, on which is formed magnetic transfer information on a transfer receiving body, and
forming a conjoined body consisting only of the transfer master and transfer receiving body, by pushing air present between contact surfaces of the transfer master and transfer receiving body out in a direction of a non-pressurized area, by pressurizing at least one portion of a surface of the transfer master, the pressurized at least one portion acting as an area of origin of the pushing; and
a magnetic transfer step including
by bringing a magnetic field generating module close to the conjoined body, and applying a magnetic field while moving the magnetic field generating module and conjoined body in relation to each other, carrying out a magnetic transfer of the transfer information from the transfer master to the transfer receiving body;
wherein a surface roughness of portions of the transfer master in which no transfer information is formed is 1 nm or less, and the surface roughness of the transfer receiving body is 1 nm or less, and further wherein if the transfer master is placed on a horizontal surface to assume a horizontal position, no portion of the transfer master is raised more than 10 μm from the horizontal position; and
if the transfer receiving body is placed on a horizontal surface to assume a horizontal position, no portion of the transfer receiving body is raised more than 10 μm from the horizontal position.

10. The magnetic transfer method according to claim 9, wherein the portions of the transfer master are brought into contact with portions of the transfer receiving body having a surface roughness of 1 nm or less.

11. A method comprising:
stacking a first transfer master storing magnetic transfer information on a transfer receiving body having a surface roughness of 1 nm or less;
applying pressure to at least a portion of the stacked transfer master and transfer receiving body to form a conjoined body; and
moving the conjoined body relative to a magnetic field to transfer the transfer information to the transfer receiving body.

12. The method of claim 11, the applying pressure removing air from between the transfer master and the transfer receiving body.

13. The method of claim 11, the transfer master comprising an information transfer surface, the information transfer surface including a first surface portion storing magnetic transfer information, and a second surface portion different from the first surface portion, the second surface portion having a surface roughness of 1 nm or less.

14. The method of claim 11, comprising applying the pressure in a direction from an inner part of the transfer master to an outer part of the transfer master, or from one end of the transfer master to another end of the transfer master.

15. The method of claim 11, comprising applying the pressure with a pressure of 2.0 to 20 kg/cm².

16. The method of claim 11, comprising applying the pressure with a pressure of 0.5 to 20 kg/cm².

17. The method of claim 11, comprising applying the pressure with a roller.

18. The method of claim 11, further comprising stacking a second transfer master storing magnetic transfer information on a side of the transfer receiving body opposite the first transfer master.

19. A method comprising:
forming a transfer master, a surface of the transfer master including patterned areas corresponding to transfer information, and areas other than the patterned area, the areas other than the patterned areas having a surface roughness of 1 nm or less;
forming a transfer receiving medium having a surface roughness of 1 nm or less; and
bringing the surface of the transfer master and the surface of the transfer receiving medium into contact.

20. The method of claim 19, further comprising:
applying pressure to the transfer master and transfer receiving medium to form a conjoined body; and
applying a magnetic field to the conjoined body to transfer the transfer information from the transfer master to the transfer receiving medium.

21. The method of claim 20, the applying pressure including using a roller.

* * * * *